United States Patent [19]

Graczyk et al.

[11] Patent Number: 4,821,286
[45] Date of Patent: Apr. 11, 1989

[54] QUATERNARY SIGNAL REGENERATOR

[75] Inventors: James F. Graczyk, Atkinson; John J. Ludwick, Hampton; Edward S. Parsons, Londonderry, all of N.H.

[73] Assignees: American Telephone and Telegraph Company, New York, N.Y.; AT&T Bell Laboratories, Murray Hill, N.J.

[21] Appl. No.: 867,218

[22] Filed: May 27, 1986

[51] Int. Cl.$^4$ .................................. H04L 25/60
[52] U.S. Cl. .................................. 375/4; 375/17; 307/260
[58] Field of Search .................. 375/4, 17, 18, 19, 43; 379/338, 340, 341; 178/68, 69 R; 307/268, 260

[56] References Cited

U.S. PATENT DOCUMENTS

| | | | |
|---|---|---|---|
| 4,011,405 | 3/1977 | Ridout et al. | 375/18 |
| 4,078,157 | 3/1978 | Lender et al. | 375/4 |
| 4,092,596 | 5/1978 | Dickinson et al. | 375/43 |
| 4,123,625 | 10/1978 | Chow | 375/4 |
| 4,408,189 | 10/1983 | Betts et al. | 375/17 |
| 4,468,787 | 8/1984 | Keiper, Jr. | 375/17 |
| 4,592,068 | 5/1986 | Jessop et al. | 379/340 |
| 4,606,046 | 8/1986 | Ludwick | 375/17 |

OTHER PUBLICATIONS

Kiwimagi "Multilevel Signal Transfer", IBM Techincal Disclosure Bulletin, vol. 21., No. 5, Oct. 1978.
"A Bipolar Repeater for Pulse Code Modulation Signal", Bell System Technical Journal, Jan. 1962, J. S. Mayo, pp. 25–97.
"The T1 Carrier System", Bell System Technical Journal, Sep., 1965, K. E. Fultz, et al., pp. 1405–1451.

Primary Examiner—Robert L. Griffin
Assistant Examiner—Stephen Chin
Attorney, Agent, or Firm—Richard B. Havill

[57] ABSTRACT

A digital signal regenerator receives a four-level input signal, amplifies, reshapes, and retimes that signal into a regenerated four-level output signal. A wide range controlled equalizer amplifies and reshapes the four-level input signal into an intermediate signal. A variable all-pass circuit varies the shape of the equalizer's phase characteristic to optimally shape the four-level signal as a function of the maximum amplitude of the four-level input signal. The reshaped four-level signal is retimed and amplified into the regenerated four-level output signal. This enable multiplying the rate at which information is transmitted for a selected pulse rate in the transmission line.

5 Claims, 8 Drawing Sheets

SAMPLING INSTANTS

FILTERED
EYE

SAMPLING INSTANTS

RECTIFIED
FILTERED
EYE

SAMPLING INSTANTS

QUATERNARY SIGNAL REGENERATOR

BACKGROUND OF THE INVENTION

This invention relates to a digital signal regenerator which may be more particularly described as a regenerator for regenerating a quaternary, or four-level, signal.

In the prior art, signal regenerators used in digital transmission systems typically regenerate a bipolar return-to-zero signal. Such a bipolar signal represents transmitted logic ones as alternate positive and negative polarity pulses having a level of one. Between transmitted pulses, the signal returns to the zero level. Transmitted logic zeros are represented by the zero level during a pulse sample time.

The transmission rate for such a bipolar return-to-zero signal is limited to one bit of information during each time slot. This maximum transmission rate is determined on exchange grade cable pairs by cross-talk coupling paths between conductors. Coupling path loss decreases with increasing frequency. As a result, interference between signals at higher transmission rates degrades system performance.

Some digital transmission routes have experienced enough growth in communications needs that the cable facility either is filled to capacity or is nearing full capacity. In either case there is a problem in providing route relief.

One way to provide relief is to place a new cable along the route. In view of the high cost of providing copper wire pairs, this is a very expensive solution.

Another way to provide relief is to replace the electronics of the digital transmission system with electronics which will transmit the same amount of information more quickly. If a higher pulse rate is chosen for increasing the amount of information transmitted during a predetermined interval, it is necessary to operate at a higher frequency and to reduce repeater spacings along the cable route. Cable loss between repeaters, level differences between transmitted and received signals, and cross-talk are all reduced because of reduced repeater spacings. Such reduced repeater spacings, however, increase the number of repeaters and the cost per channel mile.

What is needed to provide economical relief is a digital transmission system that increases the rate of information flow without substantially increasing the frequency of operation. Such a system should use the existing cable, retain existing repeater spacing, and reuse existing repeater sites while providing increased capacity. There is a problem in designing a line regenerator which will transmit more information during a predetermined time without increasing the line frequency.

SUMMARY OF THE INVENTION

This problem is solved by a digital signal regenerator that receives a four-level input signal, amplifies, reshapes, and retimes that signal into a regenerated four-level output signal. A wide range controlled equalizer amplifies and reshapes the four-level input signal into an intermediate signal. A variable all-pass circuit varies the shapes of the phase characteristic of the reshaped four-level signal as a function of the maximum amplitude of the reshaped four-level signal. The reshaped four-level signal is retimed and amplified into the regenerated four-level output signal.

BRIEF DESCRIPTION OF THE DRAWINGS

A better understanding of the invention may be derived by reading the following detailed description of an illustrative embodiment thereof with reference to the appended drawings wherein.

DETAILED DESCRIPTION

Figure 1:
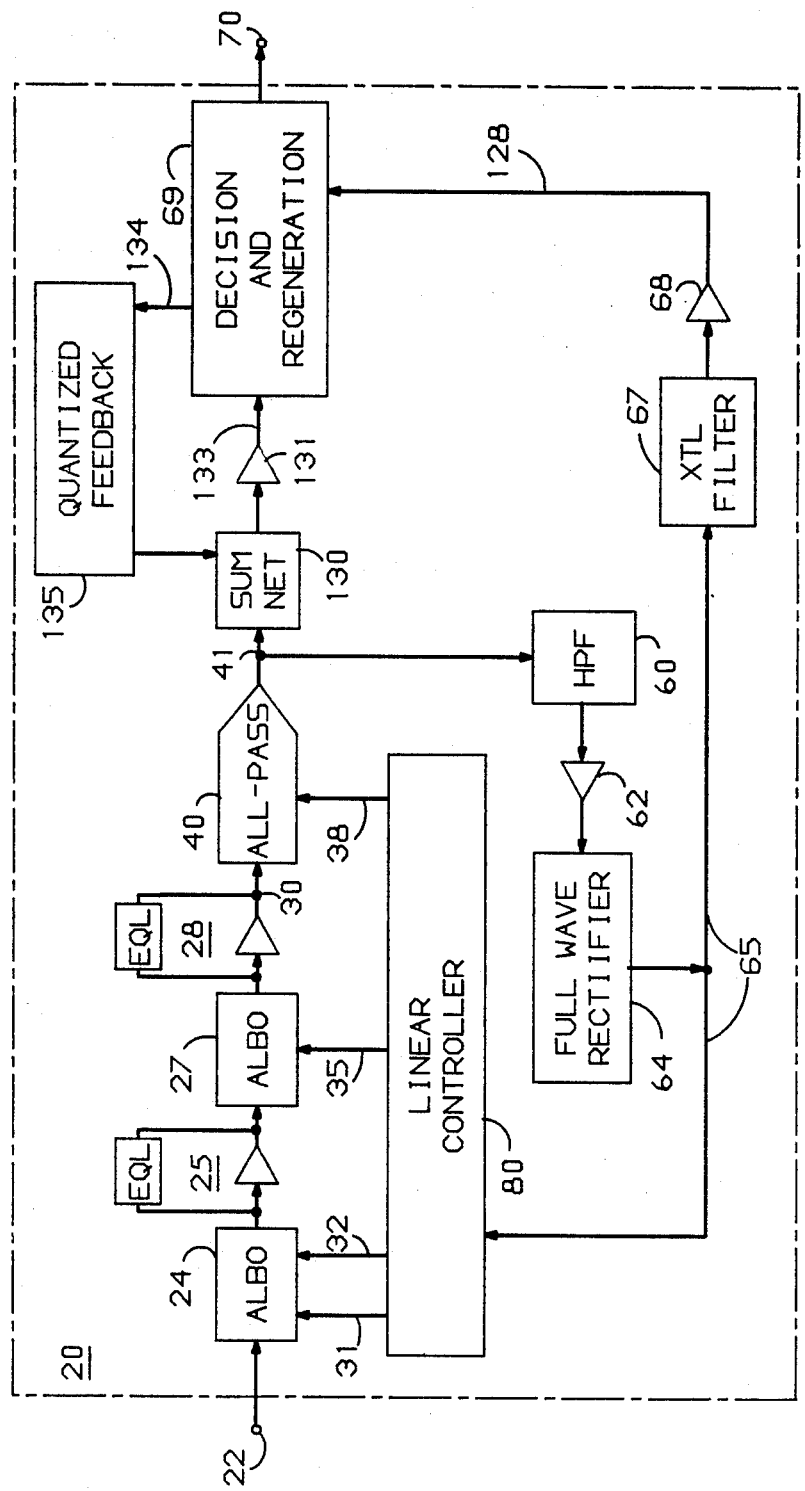
FIG. 1 is a block diagram of a quaternary signal regenerator.

Referring now to FIG. 1, a digital signal regenerator 20 is arranged for receiving an attenuated four-level input signal from a wire pair on an input terminal 22 and for amplifying, reshaping and retiming the input signal into a regenerated four-level output signal on an output terminal 70. The attenuated four-level input signal is processed by a two-stage automatic line buildout (ALBO) circuit 24, an equalizing amplifier 25, a single stage automatic line buildout circuit 27 and another equalizing amplifier 28 into an intermediate signal at a circuit node 30. The intermediate signal is an amplified and reshaped version of the four-level input signal.

Figure 2:
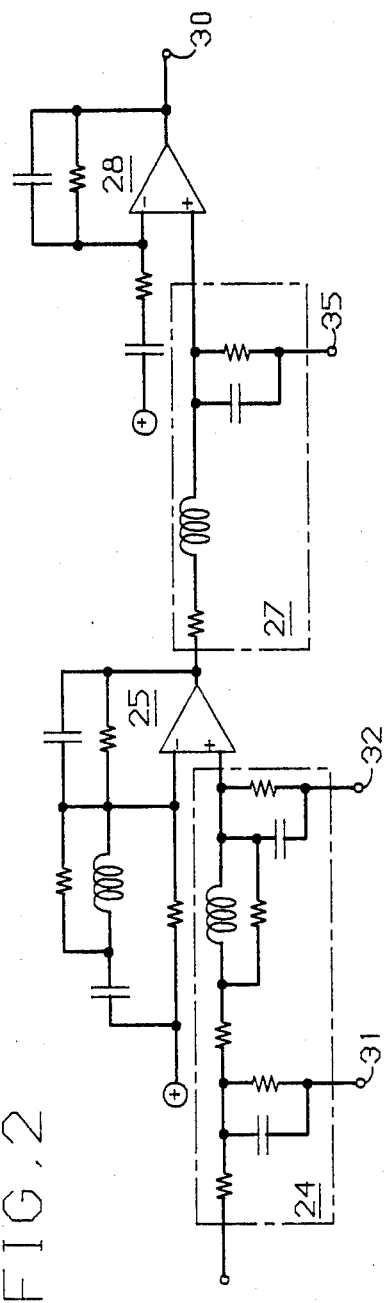
FIG. 2 is a schematic diagram of a tandem arrangement of the automatic line buildout circuits with amplifiers.

In FIG. 2 there is shown in detail a tandem circuit configuration including the automatic line buildout circuits 24 and 27 together with the associated equalizing amplifiers 25 and 28.

Automatic line buildout circuit 24 is an arrangement that includes two stages, each of which is controllable by a variable impedance. The two variable impedances interconnect with leads 31 and 32, shown in both FIGS. 1 and 2. An inductor is omitted from the left-hand stage to prevent shifting the low frequency response characteristic and to reduce cost.

The other automatic line buildout circuit 27 is a single stage arrangement which is controllable by a variable impedance that interconnects with a lead 35, shown in both FIGS. 1 and 2.

Equalizing amplifiers 25 and 28 in FIG. 1 are known amplifier circuits with feedback networks.

Figure 3:
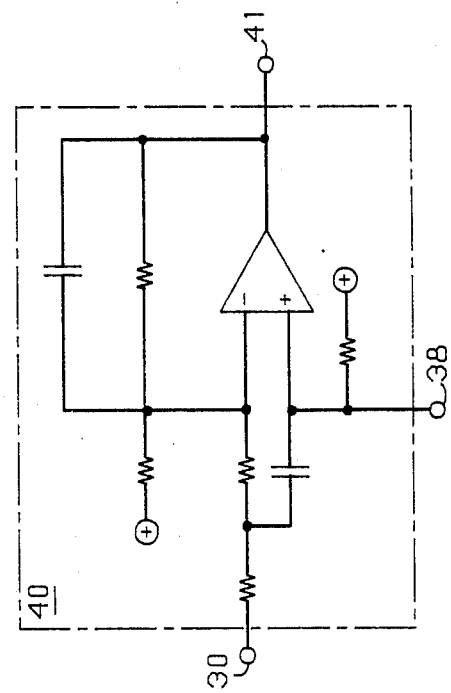
FIG. 3 is a schematic diagram of an active all-pass circuit.

The intermediate signal produced on the node 30 is applied to the input of a variable all-pass circuit 40, as shown FIGS. 1 and 3.

In FIG. 3, the all-pass circuit 40 is an arrangement of an amplifier with feedback for producing, on node 41, a reshaped four-level signal having a phase versus frequency characteristic which is varied automatically as a function of the magnitude of the input signal applied to the regenerator 20 in FIG. 1.

Figure 4:
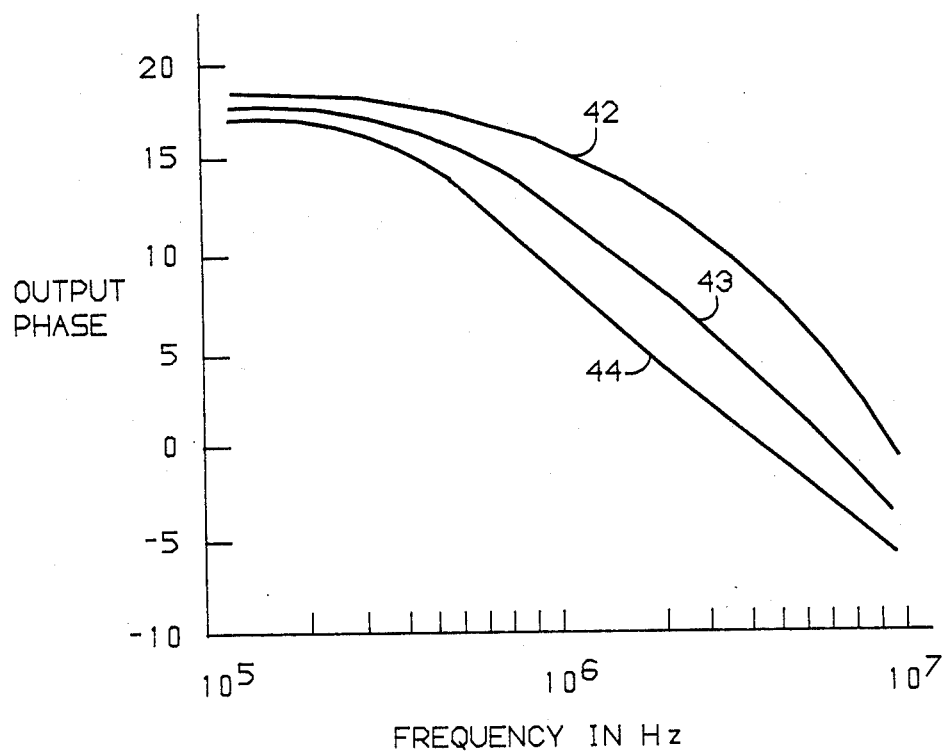
FIG. 4 is a family of phase characteristic curves versus frequency for the all-pass circuit of FIG. 3.

FIG. 4 is a family of characteristic curves 42, 43 and 44 for the all-pass circuit 40 showing the phase change (with respect to the signal at the node 30 of FIGS. 1 and 3) of the output signal (at the node 41 in FIGS. 1 and 3) as a function of frequency. Each of the characteristic curves 42, 43 and 44 is based upon a different selected impedance interconnected with the all-pass circuit. The impedances for the curves 42, 43 and 44, respectively, are 100 ohms, 250 ohms and 400 ohms. These impedances are representative of an expected range of variable impedance values which occur during normal operation.

Figure 5:
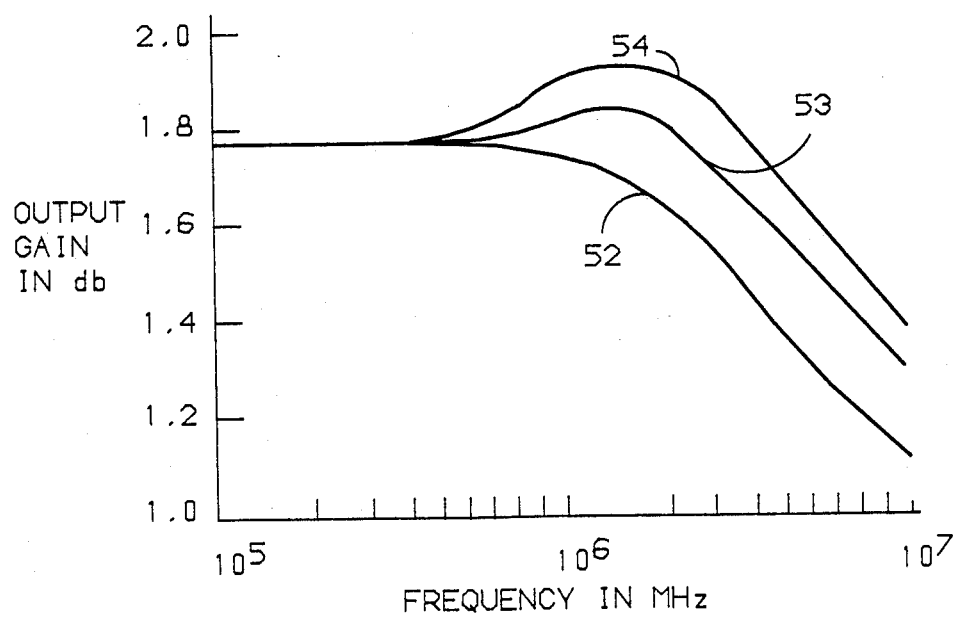
FIG. 5 is a family of gain characteristic curves versus frequency for the all-pass circuit of FIG. 3.

FIG. 5 is a family of characteristic curves 52, 53 and 54 for the gain of the output signal from the all-pass circuit 40 (at the terminal 41 in FIGS. 1 and 3) over the input signal (at node 30) as a function of frequency. The characteristic curves 52, 53 and 54, are based upon the same constant impedances, 100 ohms, 250 ohms, and 400 ohms, respectively, as are the characteristic curves 42, 43 and 44 of FIG. 4.

By way of lead 38 the all-pass circuit 40 of FIG. 3, however, is interconnected with a variable impedance that determines which of the characteristic curves (either as shown in FIGS. 4 and 5 or as taken from the rest of the family) is the curve of actual operation at any specific time. Operation of this control arrangement is described in greater detail in a copending U.S. patent application, filed concurrently herewith in the names of J. J. Ludwick and E. S. Parsons, Ser. No. 866,901.

Figure 6:
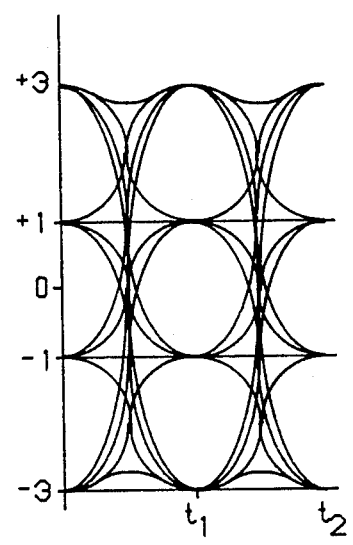
FIG. 6 is an eye diagram for a four-level signal.

Referring now to FIG. 6, there is shown an eye diagram for the four-level signal (expected to be produced on a lead 133 of FIG. 1) that includes three well-shaped eye openings at the sampling time $t_1$. Those eye openings are used for determining which of the four levels of the signal is being received at the sample time $t_1$. The control arrangements of the circuits 24, 27 and 40, along with quantized feedback current in a quantized feedback network 135, must operate effectively to keep the eye openings wide at the sample time $t_1$ in the middle of the eye openings as shown in FIG. 6.

In the arrangement of FIG. 1, the reshaped four-level signal on the lead 133 (represented by the eye diagram of FIG. 6) is to be decoded and regenerated. Additionally, the reshaped four-level signal at the node 41 is used to recover a timing signal and as the basis for producing control signals for the circuits 24, 27 and 40 of FIG. 1.

To achieve clock recovery and to produce the control signals, the reshaped four-level signal at the node 41 is filtered through a high pass filter (HPF) 60, is amplified by an amplifier 62, and is rectified by a full-waver rectifier 64.

Figure 7:
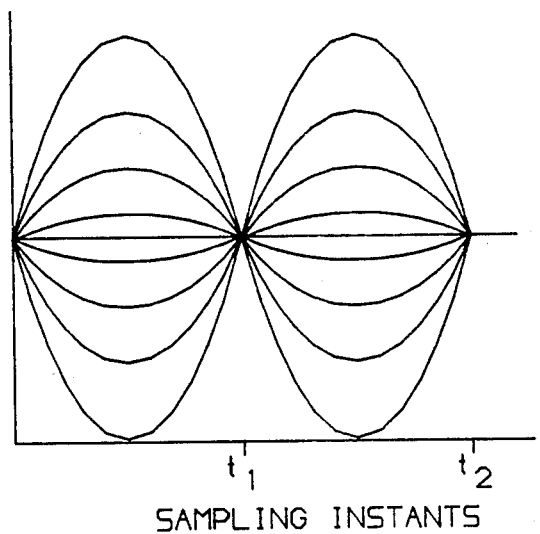
FIG. 7 is a repetitive signal sweep across two pulse time slots for the output signal from the high pass filter shown in FIG. 1.

Referring now to FIG. 7, the output of the high-pass filter 60, when plotted repetitively over two pulse time slots, appears as a series of derivative functions of the eye diagram of FIG. 6.

Figure 8:
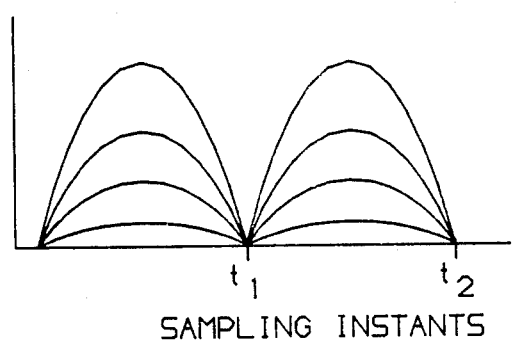
FIG. 8 is a repetitive signal sweep across two pulse time slots for the output signal from the full wave rectifier shown in FIG. 1.

FIG. 8 shows the full-wave rectified output signal of the filter 60, when plotted repetitively over two pulse time slots, as that signal emerges from the full-wave rectifier 64 in FIG. 1.

The rectified signal represented in FIG. 8 includes sufficient timing information to produce a recovered clock for retiming a regenerated output signal. As shown in FIG. 1, the output of the full-wave rectifier 64 is applied by way of a lead 65 to a crystal filter 67 for producing a clock signal that is dependent upon the pulse rate of the four-level signal received at the input terminal 22. This clock signal is amplified by a limiting amplifier 68 to form a good square wave that is applied to the decision and regeneration circuit 69 for retiming the four-level signal.

The rectified signal represented in FIG. 8 includes sufficient amplitude information related to the input signal received on the input terminal 22 to produce control signals for the automatic line buildout circuits 24 and 27 and for the all-pass circuit 40 of FIG. 1. In FIG. 1 the rectified signal is applied by way of the lead 65 to a linear controller circuit 80 for producing control signals.

Figure 9:
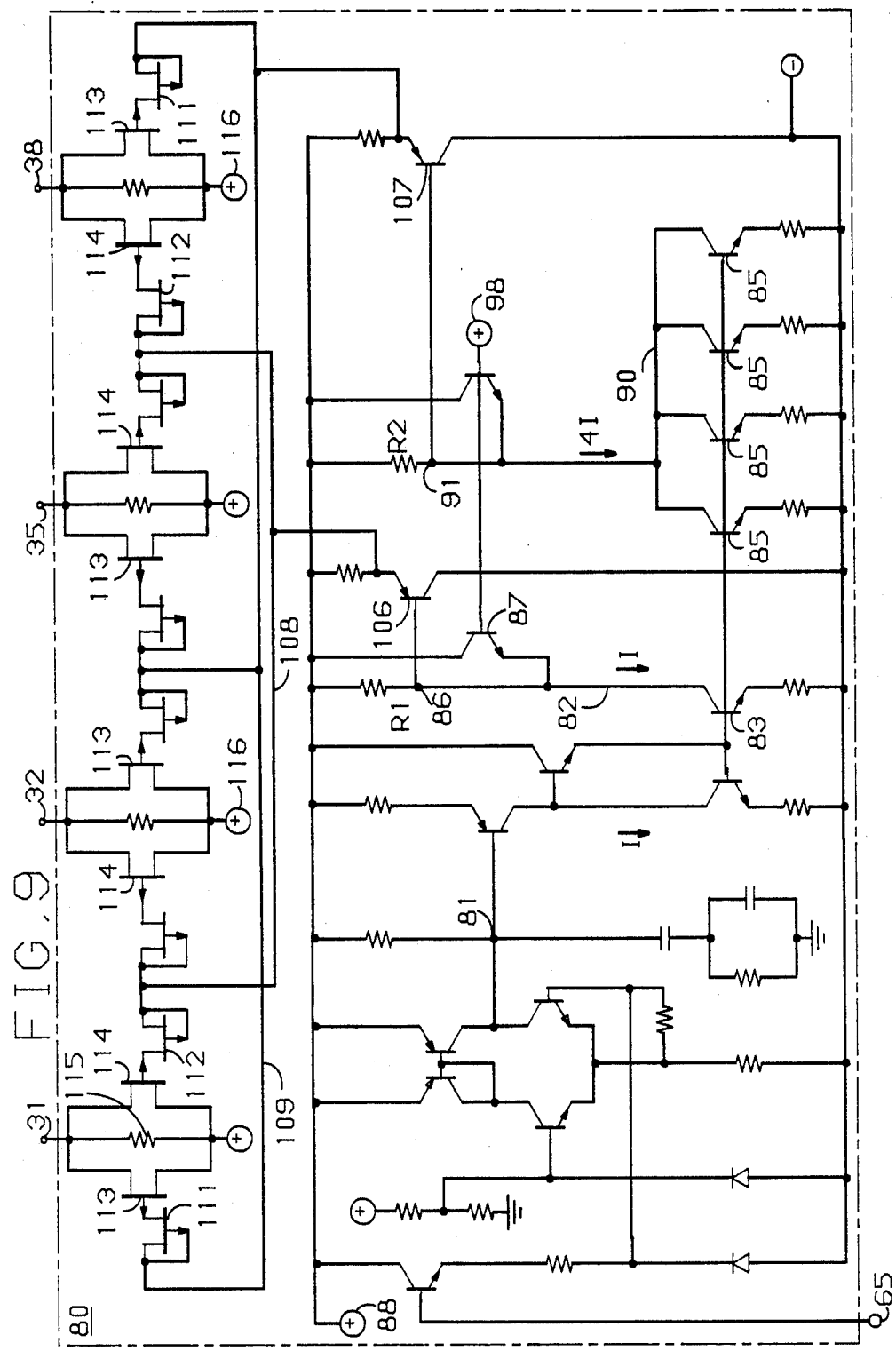
FIG. 9 is a schematic diagram of a wide range linear controller circuit.

Referring now to FIG. 9, there is shown the schematic diagram of the linear controller circuit 80, which is similar to the circuit arrangement disclosed in a copending U.S. patent application, filed concurrently herewith in the names of J. J. Ludwick and E. S. Parsons, Ser. No. 867,063 and incorporated herein by reference. The reader is referred to that patent application for a detailed description of the arrangement and operation of the linear controller circuit 80.

For purposes of this application, the circuit 80 is described briefly hereinafter to provide an understanding of the operation of the regenerator 20 of FIG. 1.

The signal applied by way of the lead 65 to the input of the circuit 80 in FIG. 9 is envelope detected to produce at a node 81 a slowly varying d.c. input control signal representing the maximum amplitude occurring in a sequence of pulses received at the input terminal 22 of FIG. 1. This maximum amplitude is variable as a result of cable span length, ambient temperature surrounding the cable, and the transmitted signal level being applied to the cable. Any change in these parameters will cause different voltage levels to occur at the node 81 in FIG. 9.

As a result of the input control signal voltage on the node 81, a variable current I is conducted into a current mirror causing a similar magnitude current I in an output leg 82 at the collector of the transistor 83 in the current mirror. Four transistors 85, which are similar to the transistor 83, are connected such that their outputs are in a multiple-arrangement forming a larger magnitude current mirror output.

Current I, which is conducted into the collector of the transistor 83, also is conducted through a resistor $R_1$ that has a clamping transistor 87 connected thereacross. Voltage drop across the resistor $R_1$ varies with the magnitude of current conducted therethrough. A bias source 88 is connected to the resistor $R_1$. All of the current I is conducted through that resistor while the magnitude of the current is low. When the magnitude of the current I is large enough for the resulting voltage drop thereacross to turn on the clamping transistor 87, that transistor limits any further increase in current through the resistor $R_1$. A node 86 is held at the potential of the bias source 88 when the current I equals zero. When current I increases above zero, the potential at the node 86 generally varies with the magnitude of the input control signal on node 81 until node 86 reaches the potential which turns on the clamping transistor 87. Then the potential on node 86 is held substantially constant for any further swing of the magnitude of the input control signal on the node 81.

Figure 10:
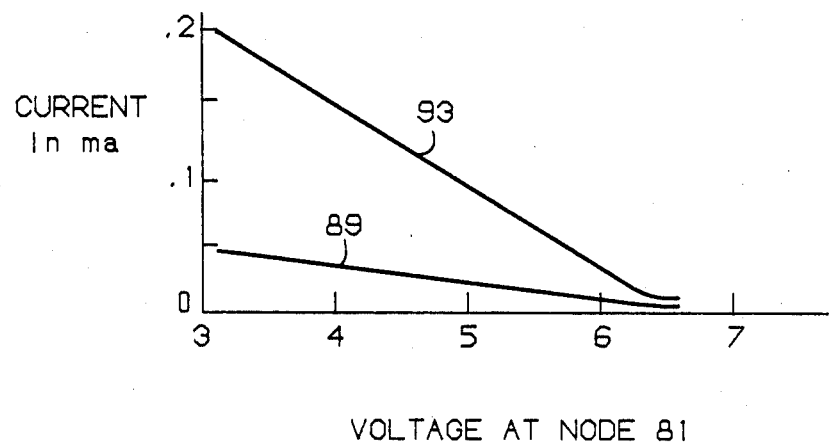
FIG. 10 shows transfer characteristic curves from an input control signal to currents in the linear controller circuit.

Referring now to FIG. 10, there is shown a transfer characteristic curve 89 from the magnitude of the voltage on the node 81 to the magnitudes of the current I. It is noted that the magnitude of the current I, as represented by curve 89, increases inversely with respect to the magnitude of the input control signal between the node 81 and reference ground in FIG. 9.

In FIG. 9 another current source, made up of the four transistors 85 connected in a multiple arrangement to a common lead 90, supplies current 4I to a resistor $R_2$ and a clamping transistor 92. Resistor $R_2$ and transistor 92 are arranged to operate similarly to the resistor $R_1$ and transistor 87 just described. Because of the multiple current source arrangement, current supplied in the lead 90 has a magnitude equal to four times the magnitude of the current I. In FIG. 10, there is also shown a transfer characteristic curve 93 from the magnitude of the voltage on the node 81 to the magnitude of the current 4I in FIG. 9.

In the exemplary configuration, the reistors $R_1$ and $R_2$ have equal resistance. For small magnitudes of current, the currents I and 4I at the nodes 86 and 91, respectively, are conducted entirely through the resistors $R_1$ and $R_2$.

Figure 11:
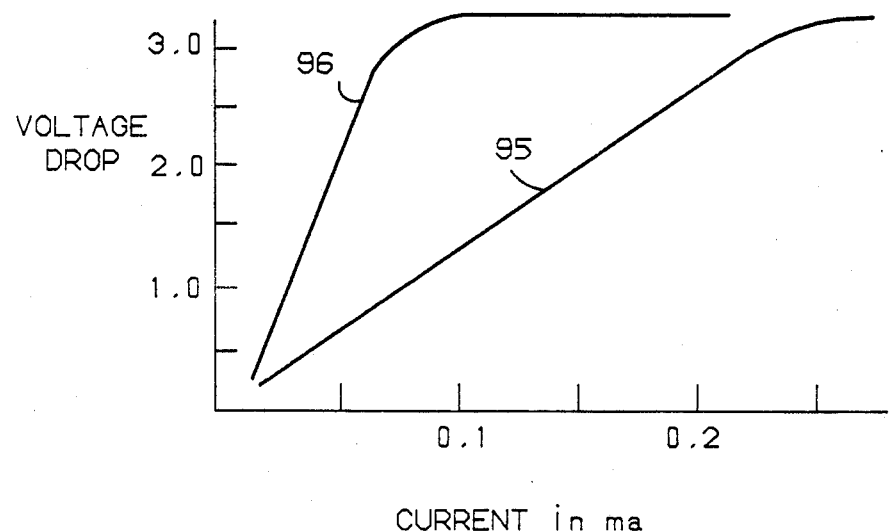
FIG. 11 shows characteristic curves of voltage drops across resistors as a function of current in the linear controller circuit.

FIG. 11 presents curves 95 and 96 showing the voltage drops produced across the resistors $R_1$ and $R_2$, respectively, in response to the currents that they conduct. In operation, the voltages produced on the nodes 86 and 91 in FIG. 9 are determined by the bias voltage 88 less the drop across the relevant resistor. As previously mentioned, the clamping transistors 87 and 92 limit the lowest possible voltages to a magnitude determined by a reference voltage 98 applied to the base electrodes of the transistors 87 and 92 in FIG. 9.

Figure 12:
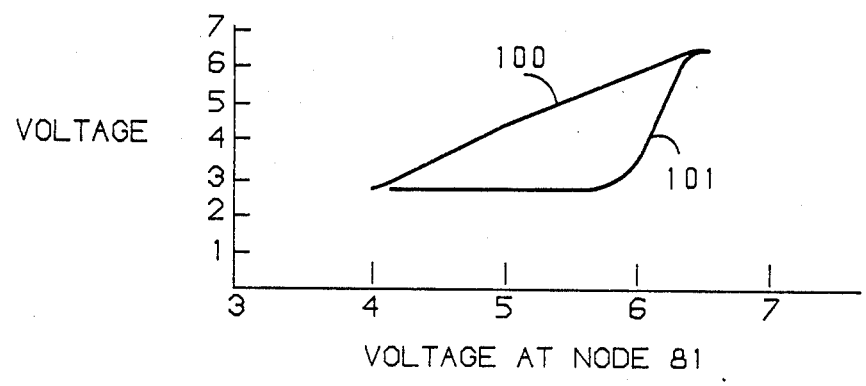
FIG. 12 shows characteristic curves of node voltages as a function of a control signal voltage in the linear controller circuit.

Referring now to FIG. 12, there is shown transfer characteristic curves 100 and 101 for the voltages at the nodes 86 and 91, respectively, as a function of the control signal voltage applied on the node 81 of FIG. 9.

In FIG. 9, a pair of transistors 106 and 107, arranged as emitter-followers, transfer the voltages produced on the nodes 86 and 91, respectively, through a pair of leads 108 and 109 as JFET control signals. These JFET control signals are applied to separate inputs of a variable impedance arrangement. The variable impedance arrangement includes four separate parts. Each of the parts includes four junction field-effect transistors (JFETs) 111, 112, 113 and 114. JFETs 111 and 112 are diode connected and are arranged as gating devices between the leads 108 and 109 and the input gate electrodes of the JFETs 113 and 114, respectively. Drain-to-source paths of the JFETs 113 and 114 and a resistor 115 are connected in a parallel circuit combination between a reference voltage 116 and the output, such as on the lead 31.

A wide range equivalent impedance is produced by each of the parallel circuit combinations of the JFETs 113 and 114 as the voltages on the nodes 86 and 91 vary. Clamping the voltages on the nodes 86 and 91 avoids forward biasing the gate junctions in the FETs and prevents those junctions from defusing. Both JFETs 113 and 114 have like characteristics, both physical and electrical, except that they are designed to have different minimum drain-to-source impedances. For the exemplary embodiment, the minimum drain-to-source impedances of the JFETs 113 and 114 are selected to be 100 ohms and 400 ohms, respectively.

Figure 13:
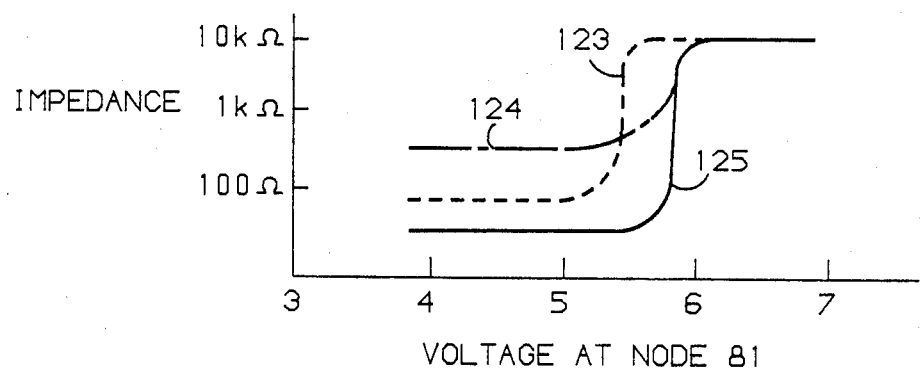
FIG. 13 presents impedance curves for the variable impedances of the linear controller circuit.

In FIG. 13, the variable impedances 123 and 124 of the JFETs 113 and 114 together with the variable equivalent impedance 125 of the parallel circuit combination are shown as functions of the control signal voltage on the node 81 of FIG. 9. As the equivalent impedance of the parallel circuit combination varies, it is used as a wide range linear controller under control of the magnitude of the input signal voltage.

One terminal of each of the variable impedances is connected to either one of the automatic line buildout circuits 24 and 27 or the all-pass circuit 40 shown in FIGS. 1, 2, and 3. Two leads 31 and 32 connect with the ALBO circuit 24 to control line buildout automatically in accordance with temporal conditions such as the cable span length, facility type and ambient temperature. Similarly lead 35 connects with the ALBO circuit 27 for additional automatic line buildout control. A fourth lead 38 connects with the all-pass circuit 40 for controlling the phase shift characteristic depending upon temporal conditions.

As a result of the automatic control of the line buildout and the phase shift characteristics, the regenerator 20 of FIG. 1 can operate at a high pulse rate over a wide range of cable span lengths, facility types and ambient temperature variations.

As a stream of pulses is received at the input terminal 22 of FIG. 1, the pulses are applied through the ALBO circuit 24, the equalizing amplifier 25, the ALBO circuit 27, the equalizing amplifier 28 and the all-pass circuit 40 to the node 41. These pulses, no matter what their received shape might be, are reshaped by those circuits to produce pulses having a consistent level at node 41. From here the signal is fed back through the filter 60, the amplifier 62 and the full wave rectifier 64 to produce on the lead 128 retiming signals by way of the filter 67 and a clock amplifier 68 and to produce on the leads 31, 32, 35 and 38 control signals by way of the linear controller 80.

Also, the pulse stream at node 41 continues forward through the regenerator 20. From the node 41 the pulse stream proceeds through a summing network 130, an amplifier 131 and a lead 133 to the decision and regeneration circuit 69 to the output terminal 70. Output signals from the decision and regeneration circuit 69 are fed back through a lead 134 and a quantized feedback network 135 to the summing network 130 where the quantized feedback signals are summed with the pulse stream that occurs on the node 41 for producing the eye diagram shown in FIG. 6.

Figure 14:
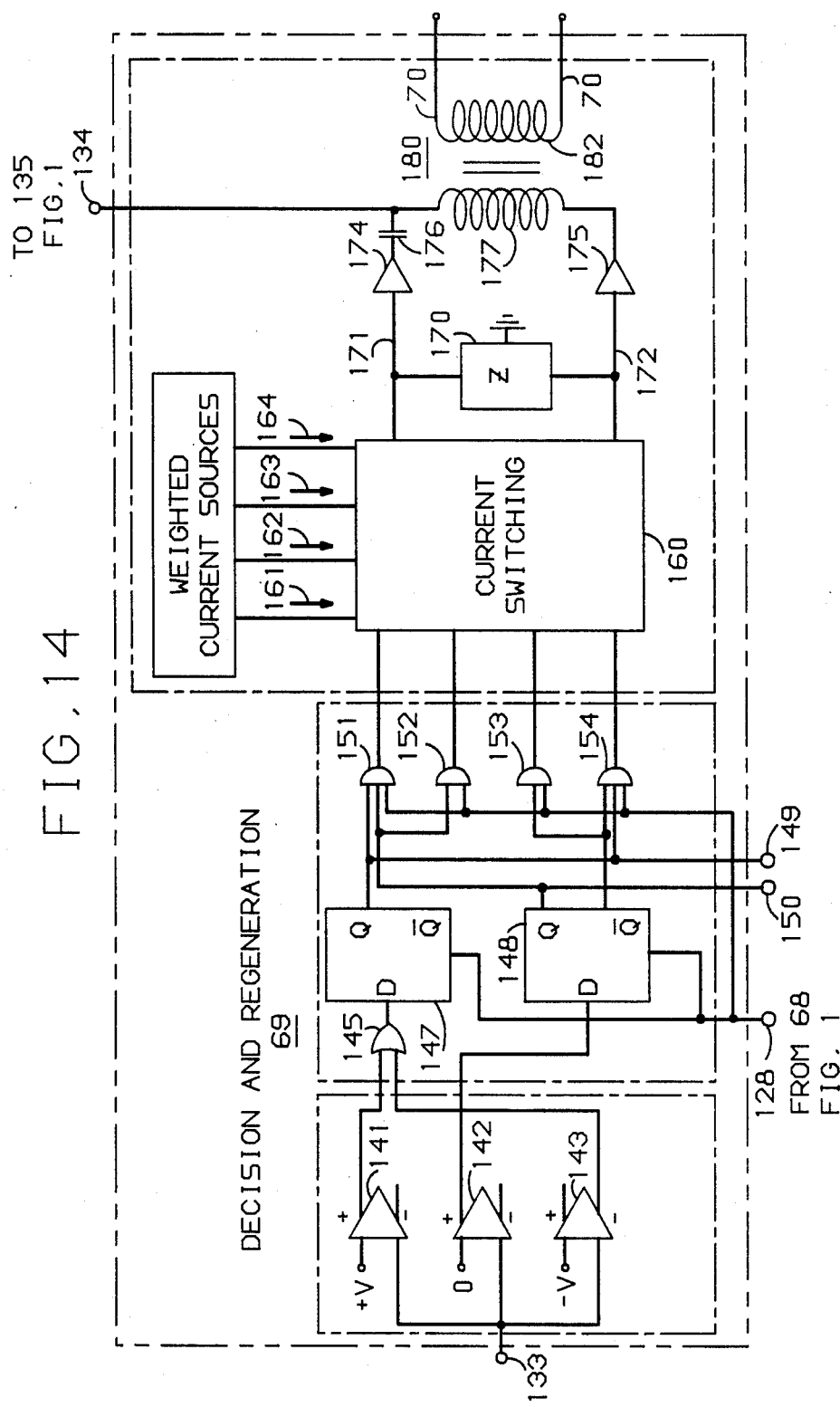
FIG. 14 is a block diagram of a decoder and four-level converter circuit.

Referring now to FIG. 14, there is shown a schematic diagram of the decision and regeneration circuit 69. The input signal amplified by way of lead 133 to the circuit 69 is a sequence of four-level pulses which trace a four-level eye diagram, as shown in FIG. 6, when the signal is retraced along the same time axis every second time slot.

In the decision and regeneration circuit 69, this input signal is applied in a multiple arrangement to the signal inputs of three comparators, or slicers 141, 142 and 143. Each comparator has a different threshold voltage applied to its reference input. The threshold voltage for the comparator 141 is $+V$; for comparator 142, zero V and for comparator 143, $-V$. Output signals from the comparators are taken from the positive polarity sides of the comparators 141 and 142 and from the negative polarity side of the comparator 143.

The decision regarding what level signal is being applied at each sample instant is determined by some logic circuitry. An OR gate 145 receives one input from the positive output of the comparator 141 and the other from the negative output of the comparator 143. As a result the OR gate 145 produces a "1" output when the input signal is either above the positive threshold +V or below the negative threshold −V.

This OR gate output is applied as an input to operate a negative edge triggered D-type flip-flop 147 that is clocked by the recovered clock signal on the lead 128. This flip-flop 147 is set high when the input signal is either above the +V level or below the −V level. Otherwise, the flip-flop 147 is set low. The flip-flop 147 is reset in response to each clock negative going edge.

The output signal from the positive output terminal of the comparator 142 is applied directly to the input of the negative edge triggered D-type flip-flop 148 which is set when the input signal is above the zero volt reference. Otherwise the flip-flop 148 is reset each clock negative going edge.

Information stored in the flip-flops 147 and 148 represents two separate binary streams of data that can be recovered separately on leads 149 and 150. With the information representing the sliced input signal stored in the flip-flops 147 and 148, the information content of the received signal is retimed and formed into one-out-of-four low signals by an array of four AND gates which respond to the outputs of the flip-flops 147 and 148 and to the recovered clock signal on the lead 128. AND gate 151 produces a "1" output when flip-flops 147 and 148 both are set indicating that the signal on the lead 133 exceeds the threshold level V and that the polarity is positive. AND gate 152 produces a "1" output when the flip-flop 148 is set indicating that the signal on the lead 133 is a positive polarity signal. AND gate 153 produces a "1" output when the flip-flop 148 is reset indicating that the polarity of the signal on the lead 133 is a negative polarity signal. AND gate 154 produces a "1" output signal when the flip-flop 147 is set and the flip-flop 148 is reset indicating that the signal on the lead 133 exceeds the threshold level V and that the polarity of the signal is negative. It is noted that one and only one of the AND gates 151, 152, 153 and 154 produces a "0" output at any time. Thus, the outputs of the AND gates are one-out-of-N code words.

All of the AND gates 151, 152, 153 and 154 produce output signals which represent the information content of the four-level input signal applied to the input terminal 22 and the signal occurring on the lead 133 of FIG. 1. These signals from the AND gates are applied as control inputs to a current switching circuit 160. In the current switching circuit 160 of FIG. 14, the control signals from the AND gates switch four weighted currents 161, 162, 163 and 164 through a balanced impedance network 170 to regenerate the four levels of the signal received by the regenerator 20 at the input terminal 22 of FIG. 1. Various combinations of the weighted currents through busses 171 and 172 and the balanced impedance 170 to produce four combinations of voltages which are applied to the inputs of a balanced driver arrangement. The outputs of the drivers 174 and 175 are coupled through a capacitor 176 and a primary winding 177 of an output transformer 180. Balanced regenerated four-level output signals are produced by a secondary winding 182 of the output transformer.

A more complete description of the current switching and output driver circuitry of the regenerator 20 is presented in U.S. Pat. No. 4,606,046, issued in the name of J. J. Ludwick.

Thus there has been described, a regenerator for a four-level stream of data. This regenerator advantageously boosts, reshapes and retimes a stream of four-level signals at spaced intervals along a transmission line. The described four-level signal regenerator can replace old regenerators, designed for bipolar signals at the same frequency and presently spaced along an existing cable. By so replacing the bipolar signal regenerators with the same frequency four-level signal regenerators along the cable, the rate of information transmission is doubled. The information transmission rate is increased because each signal level represents two bits of binary information. A substantial economic advantage is derived from doubling the rate of information transmission over the existing cable.

By modifying the logic of the decision and regeneration circuit 69, the arrangement can regenerate other multiple level signals. Thus a one-out-of-N code word produces a correlated N-level output signal.

The foregoing describes an embodiment of the subject invention. The described embodiment, together with other embodiments made obvious in view thereof, are considered to be within the scope of the appended claims.

What is claimed is:

1. A digital signal regenerator comprising
   means for receiving a four-level input signal;
   a controlled shaping circuit means, responsive to the four-level input signal and plural control signals, for amplifying and reshaping the input signal into a reshaped four-level signal;
   means for deriving the plural control signals from a maximum amplitude of the four-level input signal;
   means, responsive to the reshaped four-level signal, for producing a recovered clock signal; and
   means, responsive to the reshaped four-level signal and the recovered clock signal, for regenerating the reshaped four-level signal into a regenerated four-level output signal.

2. A digital signal regenerator comprising
   means for receiving a four-level input signal,
   a controlled shaping circuit means, responsive to the four-level input signal and plural control signals, derived from a maximum amplitude of the four-level input signal, for amplifying and reshaping the input signal into a reshaped four-level signal,
   means, responsive to the reshaped four-level signal, for producing a recovered clock signal,
   means, responsive to the reshaped four-level signal and the recovered clock signal, for regenerating the reshaped four-level signal into a regenerated four-level output signal,
   the controlled shaping circuit means include in a tandem configuration at least one automatic line buildout circuit and an automatic all-pass circuit, the four-level signal being applied through the automatic line buildout circuit and the automatic all-pass circuit to the regenerating means, and
   a linear controller, responsive to an output signal produced by the automatic all-pass circuit, produces the plural control signals, each control signal automatically adjusting the configuration of the automatic line buildout circuit or one of the automatic line buildout circuits and the configuration of the all-pass circuit to compensate for different temporal operating conditions.

3. A digital signal regenerator, in accordance with claim 2, wherein
the regenerating means include
a decision circuit, responsive to the four-level input signal and to the recovered clock signal, for determining information representing which of the four levels of input signal occurs at regular sample times, and
means, responsive to the information representing the four-level input signal and to the recovered clock signal, for producing an enhanced four-level output signal representing the four-level input signal with accurately retimed pulses.

4. A digital signal generator comprising
means for receiving a four-level input signal;
a controlled shaping circuit means, responsive to the four-level input signal and plural control signals, for amplifying and reshaping the input signal into a reshaped four-level signal;
means for deriving the plural control signals from a maximum amplitude of the four-level input signal;
means, responsive to the reshaped four-level signal, for producing a recovered clock signal;
means, responsive to the reshaped four-level signal and the recovered clock signal, for regenerating the reshaped four-level signal into a regenerated four-level output signal;
a decision circuit, responsive to the four-level input signal and to the recovered clock signal, for determining which of the four levels of input signal occurs at regular sample times; and
means, responsive to the four levels of the input signal and to the recovered clock signal, for producing an enhanced four-level output signal representing the four-level input signal with accurately retimed pulses.

5. A regenerator for a bipolar digital signal transmission line comprising
an equalizer for receiving bipolar input signals including pulses at a regular rate and for producing equalized signals in response thereto;
a timing circuit, responsive to the equalized signals, for extracting information and reproducing a clock signal at the regular pulse rate;
a decision circuit, responsive to the equalized signals and the reproduced clock signal, for regenerating a sequence of one-out-of-N code words, wherein N is an integer greater than two; and
a regeneration circuit, responsive to the one-out-of-N code words, for producing N-level bipolar output signals correlated with the one-out-of-N code words.

* * * * *